(12) United States Patent
Jun et al.

(10) Patent No.: US 9,354,453 B2
(45) Date of Patent: May 31, 2016

(54) STEREOSCOPIC IMAGE DISPLAY DEVICE AND METHOD FOR MANUFACTURING THE SAME

(75) Inventors: Woo-Yeal Jun, Gyeongbuk (KR);
Sung-Kon Ko, Seoul (KR);
Kyung-Soon Kim, Gyeonggi-do (KR);
Young-Hee Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 525 days.

(21) Appl. No.: 13/591,358

(22) Filed: Aug. 22, 2012

(65) Prior Publication Data
US 2013/0234916 A1 Sep. 12, 2013

(30) Foreign Application Priority Data
Mar. 6, 2012 (KR) .......................... 10-2012-0023083

(51) Int. Cl.
*G02B 27/26* (2006.01)
*G02F 1/1343* (2006.01)
*G02F 1/1335* (2006.01)
*G02F 1/13363* (2006.01)

(52) U.S. Cl.
CPC .......... *G02B 27/26* (2013.01); *G02F 1/134363* (2013.01); *G02F 1/133512* (2013.01); *G02F 2001/133631* (2013.01)

(58) Field of Classification Search
CPC ................................................. G02F 1/134363
See application file for complete search history.

(56) References Cited

U.S. PATENT DOCUMENTS

| | | | | |
|---|---|---|---|---|
| 6,038,002 A * | 3/2000 | Song | .............................. | 349/43 |
| 6,198,517 B1 * | 3/2001 | Ohori et al. | ..................... | 349/43 |
| 6,307,613 B1 * | 10/2001 | Iida | ............................... | 349/158 |
| 6,559,914 B1 * | 5/2003 | Jones et al. | ................... | 349/111 |
| 6,816,222 B2 * | 11/2004 | Ono et al. | ..................... | 349/143 |
| 6,850,290 B1 * | 2/2005 | Song | ................................ | 349/43 |
| 7,304,640 B2 * | 12/2007 | Yamashita | ............. | G09G 3/006 345/207 |
| 8,189,140 B2 * | 5/2012 | Kim et al. | ..................... | 349/106 |
| 8,493,521 B2 * | 7/2013 | Chen | .................. | G02B 27/2214 345/6 |

(Continued)

FOREIGN PATENT DOCUMENTS

| CN | 100381931 C | 4/2008 |
|---|---|---|
| CN | 101639620 A | 2/2010 |

(Continued)

OTHER PUBLICATIONS

The First Office Action dated Mar. 23, 2015 from the State Intellectual Property Office of the People's Republic of China in counterpart Chinese patent application No. 201210289204.2.

*Primary Examiner* — Kumar Patel
*Assistant Examiner* — Sejoon Ahn
(74) *Attorney, Agent, or Firm* — Morgan, Lewis & Bockius LLP

(57) ABSTRACT

The display device includes a display panel including upper and lower array substrates, and a patterned retarder to separate an image displayed on the display panel into left-eye and right-eye images, wherein the lower array substrate includes gate and data lines to define pixel areas, a pixel electrode formed at each pixel area, and a black stripe formed at a boundary between the pixel areas to display the left-eye image and the pixel areas to display the right-eye image, wherein the black stripe includes a first black stripe formed on the same layer and formed of the same material as an opaque layer of a thin film transistor, and a second black stripe overlapped with the first black stripe and formed on the same layer and formed of the same material as the pixel electrode.

18 Claims, 14 Drawing Sheets

(56) References Cited

U.S. PATENT DOCUMENTS

| | | | | |
|---|---|---|---|---|
| 8,564,746 B2* | 10/2013 | Kim et al. | | 349/106 |
| 8,570,465 B2* | 10/2013 | Kim et al. | | 349/106 |
| 2001/0013915 A1* | 8/2001 | Song | | 349/141 |
| 2002/0063835 A1* | 5/2002 | Kim | | 349/141 |
| 2002/0085156 A1* | 7/2002 | Lee | | 349/141 |
| 2002/0089624 A1* | 7/2002 | Matsumoto | | 349/106 |
| 2002/0176043 A1* | 11/2002 | Fukami et al. | | 349/141 |
| 2002/0196382 A1* | 12/2002 | Ishino | | G02F 1/1368 349/43 |
| 2003/0193284 A1* | 10/2003 | Park | | H01L 27/3244 313/504 |
| 2004/0047981 A1* | 3/2004 | Ebe | | H01J 11/12 427/77 |
| 2004/0109109 A1* | 6/2004 | Lee et al. | | 349/106 |
| 2004/0119917 A1* | 6/2004 | Lim | | 349/110 |
| 2004/0125280 A1* | 7/2004 | Kim et al. | | 349/110 |
| 2004/0201800 A1* | 10/2004 | Jin et al. | | 349/113 |
| 2005/0253984 A1* | 11/2005 | Kim et al. | | 349/106 |
| 2005/0270446 A1* | 12/2005 | Kim et al. | | 349/110 |
| 2006/0055846 A1* | 3/2006 | Roh | | G02F 1/133512 349/106 |
| 2006/0187183 A1* | 8/2006 | Naka et al. | | 345/102 |
| 2006/0227276 A1* | 10/2006 | Son | | 349/141 |
| 2007/0024770 A1* | 2/2007 | Jang et al. | | 349/43 |
| 2007/0126955 A1* | 6/2007 | Hosoya | | 349/113 |
| 2007/0182441 A1* | 8/2007 | Hwang | | 324/770 |
| 2008/0088788 A1* | 4/2008 | Cho et al. | | 349/160 |
| 2008/0100766 A1* | 5/2008 | Ming et al. | | 349/44 |
| 2008/0102548 A1* | 5/2008 | Hirakata et al. | | 438/30 |
| 2009/0079916 A1* | 3/2009 | Kim et al. | | 349/106 |
| 2009/0225243 A1 | 9/2009 | Kim et al. | | |
| 2009/0261342 A1* | 10/2009 | Zhang | | 257/72 |
| 2010/0014033 A1* | 1/2010 | Kawasaki et al. | | 349/117 |
| 2010/0026796 A1 | 2/2010 | Ohno et al. | | |
| 2010/0026920 A1* | 2/2010 | Kim et al. | | 349/15 |
| 2010/0051929 A1* | 3/2010 | Choi | | H01L 51/5284 257/40 |
| 2010/0051951 A1* | 3/2010 | Lee et al. | | 257/59 |
| 2010/0230682 A1* | 9/2010 | Song et al. | | 257/59 |
| 2010/0238097 A1* | 9/2010 | Baik | | G02B 27/26 345/87 |
| 2010/0253894 A1* | 10/2010 | Yoon | | 349/123 |
| 2010/0265230 A1* | 10/2010 | Kang | | 345/211 |
| 2010/0289884 A1* | 11/2010 | Kang | | 348/58 |
| 2010/0302634 A1* | 12/2010 | Jung | | 359/465 |
| 2011/0037783 A1* | 2/2011 | Hur et al. | | 345/690 |
| 2011/0050871 A1* | 3/2011 | Lee et al. | | 348/58 |
| 2011/0122111 A1* | 5/2011 | Brown et al. | | 345/207 |
| 2011/0122239 A1* | 5/2011 | Baik et al. | | 348/58 |
| 2011/0128269 A1* | 6/2011 | Lee et al. | | 345/211 |
| 2011/0157534 A1* | 6/2011 | Hong | | 349/141 |
| 2011/0211145 A1* | 9/2011 | Tsuruma et al. | | 349/106 |
| 2011/0294243 A1* | 12/2011 | Jeon et al. | | 438/29 |
| 2011/0308849 A1* | 12/2011 | Kondo et al. | | 174/260 |
| 2012/0013610 A1 | 1/2012 | Chae | | |
| 2012/0018679 A1* | 1/2012 | Cha et al. | | 252/500 |
| 2012/0019748 A1* | 1/2012 | Kim et al. | | 349/106 |
| 2012/0099055 A1* | 4/2012 | Kim et al. | | 349/106 |
| 2012/0105779 A1* | 5/2012 | Kim | | 349/106 |
| 2012/0105784 A1* | 5/2012 | Ho et al. | | 349/139 |
| 2012/0113337 A1* | 5/2012 | Chen et al. | | 349/15 |
| 2012/0169949 A1* | 7/2012 | Son | | 349/15 |
| 2012/0181557 A1* | 7/2012 | Kim et al. | | 257/98 |
| 2012/0182406 A1* | 7/2012 | Woo | | 348/54 |
| 2012/0200511 A1* | 8/2012 | Kim et al. | | 345/173 |
| 2012/0268813 A1* | 10/2012 | Kim et al. | | 359/450 |
| 2013/0002970 A1* | 1/2013 | Baek et al. | | 349/5 |
| 2013/0043472 A1* | 2/2013 | Chang et al. | | 257/59 |
| 2013/0044074 A1* | 2/2013 | Park et al. | | 345/174 |
| 2013/0278582 A1* | 10/2013 | Liao | | G09G 5/02 345/212 |
| 2014/0002776 A1* | 1/2014 | Kim et al. | | 349/106 |
| 2014/0071526 A1* | 3/2014 | Ryu et al. | | 359/465 |

FOREIGN PATENT DOCUMENTS

| | | |
|---|---|---|
| CN | 102156368 A | 8/2011 |
| CN | 102338953 A | 2/2012 |
| JP | 2009217231 A | 9/2009 |
| WO | 2004/034133 A2 | 4/2004 |

* cited by examiner

STEREOSCOPIC IMAGE DISPLAY DEVICE AND METHOD FOR MANUFACTURING THE SAME

This application claims the benefit of the Korean Patent Application No. P2012-0023083, filed on Mar. 6, 2012, which is hereby incorporated by reference as if fully set forth herein.

BACKGROUND OF THE INVENTION

1. Field of the Invention

The present invention relates to a stereoscopic image display device capable of preventing crosstalk of a right-eye image and left-eye image, and a method for manufacturing the same.

2. Discussion of the Related Art

In recent years, a stereoscopic image display device has been developed to allow a viewer to view a 3-Dimensional (3D) image from a 2D image displayed on the display device.

In such a stereoscopic image display device, a right-eye image and left-eye image, which have binocular parallax, are separately seen by viewer's right and left eyes. That is, the stereoscopic image display device allows a right-eye image to be seen by only the viewer's right eye and a left-eye image to be seen by only the viewer's left eye. In this way, a viewer can view a 3D image.

However, even though the viewer's right eye must perceive only a right-eye image and the viewer's left eye must perceive only a left-eye image, conventional stereoscopic image display devices often cause an erroneous situation in which a left-eye image is seen by the viewer's right eye or a right-eye image is seen by the viewer's left eye. For this reason, the conventional stereoscopic image display device may suffer from deterioration in image quality due to crosstalk of right-eye and left-eye images.

SUMMARY OF THE INVENTION

Accordingly, the present invention is directed to a stereoscopic image display device and a method for manufacturing the same that substantially obviate one or more problems due to limitations and disadvantages of the related art.

An object of the present invention is to provide a stereoscopic image display device capable of preventing crosstalk of a right-eye image and left-eye image, and a method for manufacturing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image display device includes a display panel configured to selectively form a 2-Dimensional (2D) image and a 3-Dimensional (3D) image, the display panel including a lower array substrate in which a color filter and a thin film transistor are formed on the same substrate, and an upper array substrate arranged to face the lower array substrate, and a patterned retarder to separate an image displayed on the display panel into a left-eye image and a right-eye image upon formation of the 3D image, wherein the lower array substrate includes a gate line and a data line connected to the thin film transistor and intersected each other to define pixel areas; a pixel electrode connected to the thin film transistor and formed at each pixel area; and a black stripe formed at a boundary between the pixel areas to display the left-eye image and the pixel areas to display the right-eye image, and wherein the black stripe includes a first black stripe formed on the same layer as and formed of the same material as an opaque layer included in the thin film transistor; and a second black stripe formed to overlap with the first black stripe, and formed on the same layer as and formed of the same material as the pixel electrode.

In accordance with another aspect of the present invention, a method for manufacturing a stereoscopic image display device, includes preparing a lower array substrate, wherein the lower array substrate includes a color filter and a thin film transistor formed at each pixel area on the same substrate, and first and second black stripes formed at a boundary between the pixel areas to display the left-eye image and the pixel areas to display the right-eye image, forming a display panel configured to selectively form a 2D image and a 3D image by bonding the lower array substrate and an upper array substrate to face each other, and forming a patterned retarder on the display panel, wherein the patterned retarder serves to separate an image displayed on the display panel into a left-eye image and a right-eye image upon formation of the 3D image, wherein the preparing the lower array substrate includes forming the thin film transistor, and simultaneously forming the first black stripe on the same layer as any one opaque metal layer included in the thin film transistor using the same material as the opaque metal layer, and forming a pixel electrode, connected to the thin film transistor, at the pixel area, and simultaneously forming a second black stripe on the same layer as the pixel electrode using the same material as the pixel electrode so as to overlap with the first black stripe.

The stereoscopic image display device may further include a common electrode to form a horizontal electric field with the pixel electrode, wherein the common electrode is formed on the same layer as and formed of the same material as the second black stripe, and is connected to the second black stripe.

The first black stripe may be formed in a plate shape at upper and lower sides of each pixel area except for a region where the color filter is formed, and is formed on the same layer as and formed of the same material as a gate electrode of the thin film transistor.

In a first embodiment, the second black stripe has a plurality of openings spaced apart from one another, and the plurality of openings is formed at a region where the second black stripe are overlapped with the first black stripe. In a second embodiment, the second black stripe has a single opening formed at a region where the second black stripe are overlapped with the first black stripe. In a third embodiment, the second black stripe is formed in a plate shape at a region where the second black stripe are overlapped with the first black stripe.

The patterned retarder may include a first retarder configured to transmit a first polarized light component and a second retarder configured to transmit a second polarized light component, the first and second retarders being alternately arranged, and the black stripe may overlap with a boundary between the first retarder and the second retarder.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
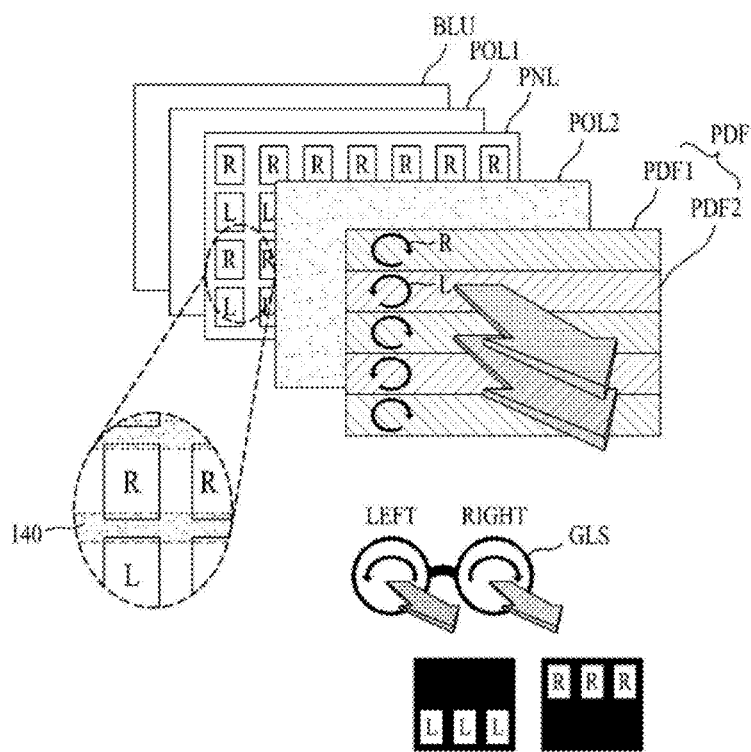
FIG. 1 is a view showing a stereoscopic image display device according to a first embodiment of the present invention.

FIG. 1 is a view showing a stereoscopic image display device according to a first embodiment of the present invention.

The stereoscopic image display device shown in FIG. 1 includes a display panel PNL, backlight unit BLU, patterned retarder PDF, and polarizing glasses GLS.

The display panel PNL includes a lower array substrate and upper array substrate, which are bonded to face each other with a liquid crystal layer interposed therebetween. The lower array substrate is of a Color Filter on Thin Film Transistor (COT) type, and a black stripe 140 is formed at a boundary between neighboring pixel areas. In particular, the black stripe 140 is formed at a boundary between pixels of an odd number (or even number) horizontal line that displays a right-eye image and pixels of an even number (or odd number) horizontal line that displays a left-eye image.

An upper polarizing film POL2 is attached to a front surface of the upper array substrate of the display panel PNL, and a lower polarizing film POL1 is attached to a rear surface of the lower array substrate.

The backlight unit BLU includes one or more light sources, and is adapted to convert light emitted from the light sources into planar light and irradiate the planar light to the display panel PNL.

The patterned retarder PDF includes first and second patterned retarders PDF1 and PDF2, light absorption axes of which are perpendicular to each other. The patterned retarder PDF serves to distinguish a left-eye image and right-eye image via polarization to show a different image for each eye. The first patterned retarder PDF1 is formed at odd number lines of the patterned retarder PDF, and transmits a first polarized light (linearly-polarized light or circularly-polarized light) component among incident light having passed through the upper polarizing film POL2. The second patterned retarder PDF2 is formed at even number lines of the patterned retarder PDF, and transmits a second polarized light (linearly-polarized light or circularly-polarized light) component among the incident light having passed through the upper polarizing film POL2. For example, the first patterned retarder PDF1 transmits right circularly-polarized light, and the second patterned retarder PDF2 transmits left circularly-polarized light.

The polarizing glasses GLS have different light absorption axes depending on polarized light components emitted from the patterned retarder PDF. For example, a left eye LEFT of the polarizing glasses GLS includes a left circularly-polarized light filter and a right eye RIGHT of the polarizing glasses GLS includes a right circularly-polarized light filter. In this case, the left eye LEFT of the polarizing glasses GLS transmits left circularly-polarized light introduced from the second patterned retarder PDF2 and intercepts light of the other polarized light component. The right eye RIGHT of the polarizing glasses GLS transmits right circularly-polarized light introduced from the first patterned retarder PDF1 and intercepts light of the other polarized light component. In this way, the left eye LEFT of the polarizing glasses GLS transmits only an image of the even number horizontal lines displayed through the second patterned retarder PDF2, allowing the viewer's left eye to see only a left-eye image. The right eye RIGHT of the polarizing glasses GLS transmits only an image of the odd number horizontal lines displayed through the first patterned retarder PDF1, allowing the viewer's right eye to see only a right-eye image.

Through the above described configuration, when the display panel PNL alternately displays a right-eye image and left-eye image on a per frame basis, the viewer can perceive a 3D image via the polarizing glasses GLS.

Figure 2:
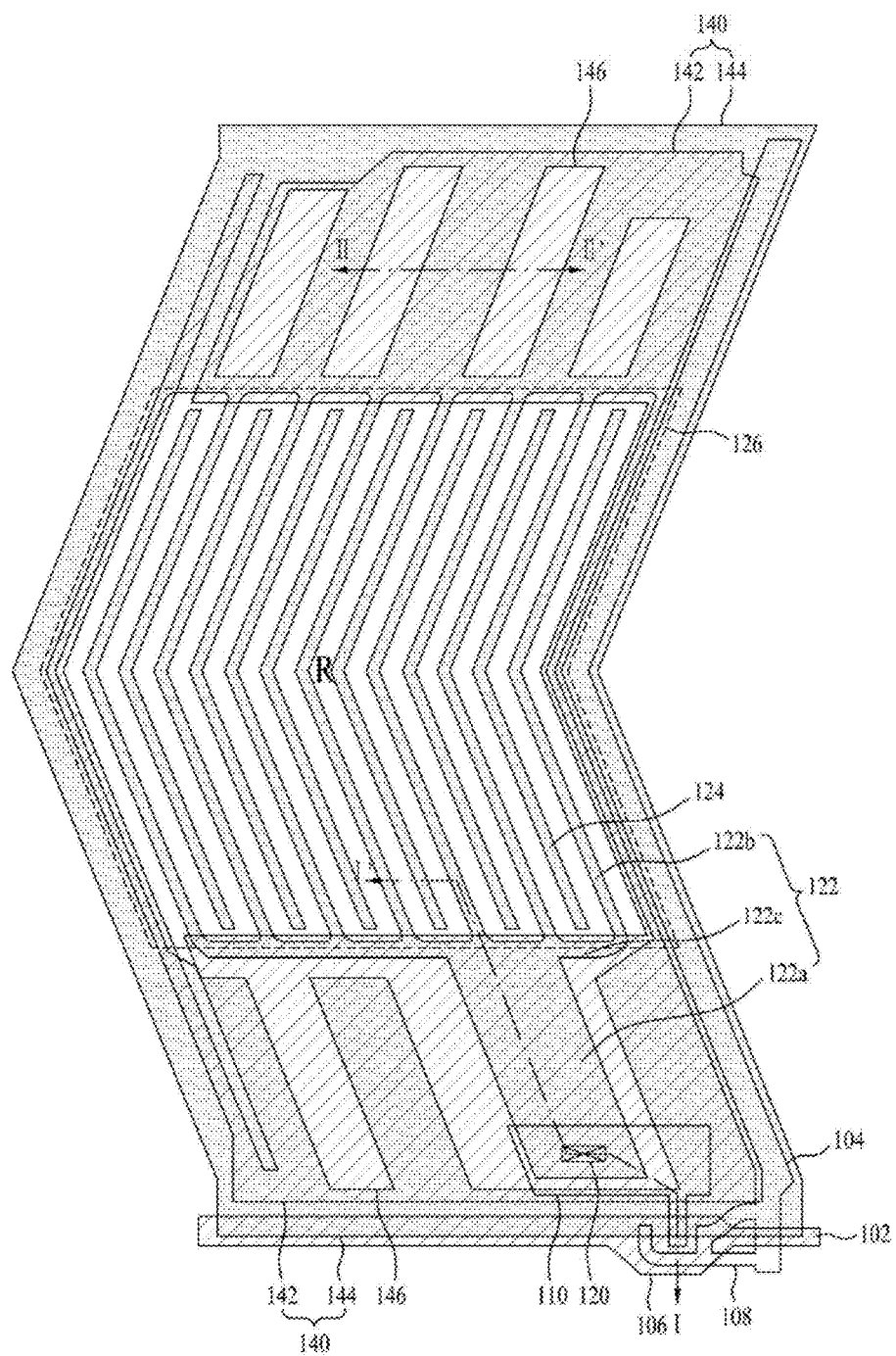
FIG. 2 is a plan view showing a lower array substrate of a display panel shown in FIG. 1.
Figure 3:
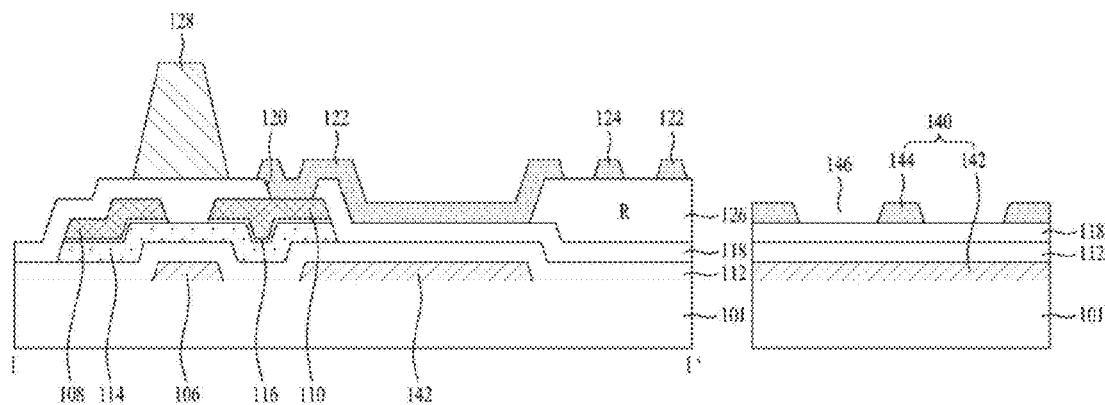
FIG. 3 is a sectional view showing the lower array substrate taken along lines "I-I" and "II-II" in FIG. 2.

FIG. 2 is a plan view showing the lower array substrate of the display panel PNL shown in FIG. 1, and FIG. 3 is a sectional view showing the lower array substrate taken along lines "I-I" and "II-II" in FIG. 2.

The lower array substrate shown in FIGS. 2 and 3 includes gate and data lines 102 and 104 formed over a lower substrate 101 to intersect each other with a gate insulating film 112 interposed therebetween to define pixel areas, a Thin Film Transistor (TFT) connected to an intersection of the gate and data lines 102 and 104, a pixel electrode 122 formed at each pixel area and connected to the thin film transistor, a common electrode 124 formed to create a lateral electric field with the pixel electrode 122 at the pixel area, color filters 126 formed over the same substrate 101 as the thin film transistor, a column spacer 128 to maintain a cell gap, and the black stripe 140 formed at a boundary between neighboring pixel areas.

The gate line 102 transmits scan signals from a gate driver (not shown), and the data line 104 transmits video signals from a data driver (not shown). The gate and data lines 102 and 104 intersect each other with the gate insulating film 112 interposed therebetween to define each pixel area.

The thin film transistor serves to supply the video signals of the data line 104 to the pixel electrode 122 in response to the scan signals of the gate line 102. To this end, the thin film transistor includes a gate electrode 106 connected to the gate line 102, a source electrode 108 connected to the data line 104, a drain electrode 110 arranged to face the source electrode 108 and connected to the pixel electrode 122, an active layer 114 overlapped with the gate line 102 with the gate insulating film 112 interposed therebetween to define a channel between the source electrode 108 and the drain electrode 110, and an ohmic contact layer 116 formed over the active layer 114 except for the channel for ohmic contact with the source electrode 108 and drain electrode 110. A semiconductor pattern including the active layer 114 and ohmic contact layer 116 is formed to overlap with the data line 104.

The pixel electrode 122 is formed by stacking an opaque conductive layer, e.g., a reflective MoTi layer, and a transparent conductive layer, e.g., a substantially non-reflective ITO or CuNx layer one above another. The pixel electrode 122 includes a first electrode portion 122a connected to the drain electrode 110, a second electrode portion 122b parallel to the common electrode 124, and a third electrode portion 122c formed, parallel to the gate line 102, between the first and second electrode portions 122a and 122b. Accordingly, the first electrode portion 122a of the pixel electrode 122 is connected to the drain electrode 110 of the thin film transistor that is exposed through a pixel contact hole 120 penetrating a protective film 118. The second electrode portion 122b of the pixel electrode 122 is formed parallel to the common electrode 122 on the same plane at each pixel area, so as to form a horizontal electric field.

The common electrode 124 is formed on the same plane as and formed of the same material as the pixel electrode 122. The common electrode 124 is connected to a second black stripe 144 that serves as a common line such that a reference voltage for driving of liquid crystals, i.e. a common voltage is applied through the second black stripe 144. Accordingly, the horizontal electric field is formed between the pixel electrode 122, to which a pixel voltage signal is supplied, and the common electrode 124, to which the common voltage is applied. The horizontal electric field causes liquid crystal molecules horizontally aligned between the lower array substrate and the upper array substrate to be rotated by dielectric anisotropy. The rotation degree of liquid crystal molecules has an effect on the transmittance of light through the pixel area, realizing formation of an image.

The color filters 126 are formed over the same lower substrate 101 as the thin film transistor to realize a Color Filter on TFT (COT) structure. The color filters 126 include red, green, and blue color filters, which are sequentially repeated in a longitudinal direction of the gate line 102, but same color filters are repeated in a longitudinal direction of the data line 104. The red, green, and blue color filters define a single unit pixel, and the single unit pixel displays an image having a predetermined color via colored light emitted through the red, green, and blue color filters.

The column spacer 128 is formed to maintain a cell gap between the upper array substrate and the lower array substrate.

The black stripe 140 is formed to overlap with a boundary between the first and second patterned retarders PDF1 and PDF2, thereby serving to prevent crosstalk of left-eye and right-eye images. More specifically, the black stripe 140 is formed between pixels of an odd number (or even number) horizontal line that displays a right-eye image and pixels of an even number (or odd number) horizontal line that displays a left-eye image. In this way, according to the present invention, an up/down viewing angle widens upon realization of a 3D image, which improves visibility of a 3D image.

More particularly, the black stripe 140 includes a first black stripe 142, which is formed on the same layer as and formed of the same material as the gate electrode 106, and the second black stripe 144, which is formed on the same layer as and formed of the same material as the pixel electrode 122.

The first black stripe 142 is formed in a plate shape structure at a remaining region of each pixel area except for a region where the color filters 126 are formed, i.e. provided at upper and lower side of each pixel area, and serves to prevent crosstalk of right-eye and left-eye images. The first black stripe 142 of one pixel may be formed parallel to the gate line 102 and may be spaced apart from or be connected to the first black stripe 142 of a neighboring pixel. In the case in which the first black stripes 142 of the neighboring pixels are connected to each other, a line width of the first black stripes 142 at an intersection with the data line 104 may be smaller than a line width at upper and lower sides of each pixel area, which may minimize generation of a parasitic capacitor.

Figure 4:
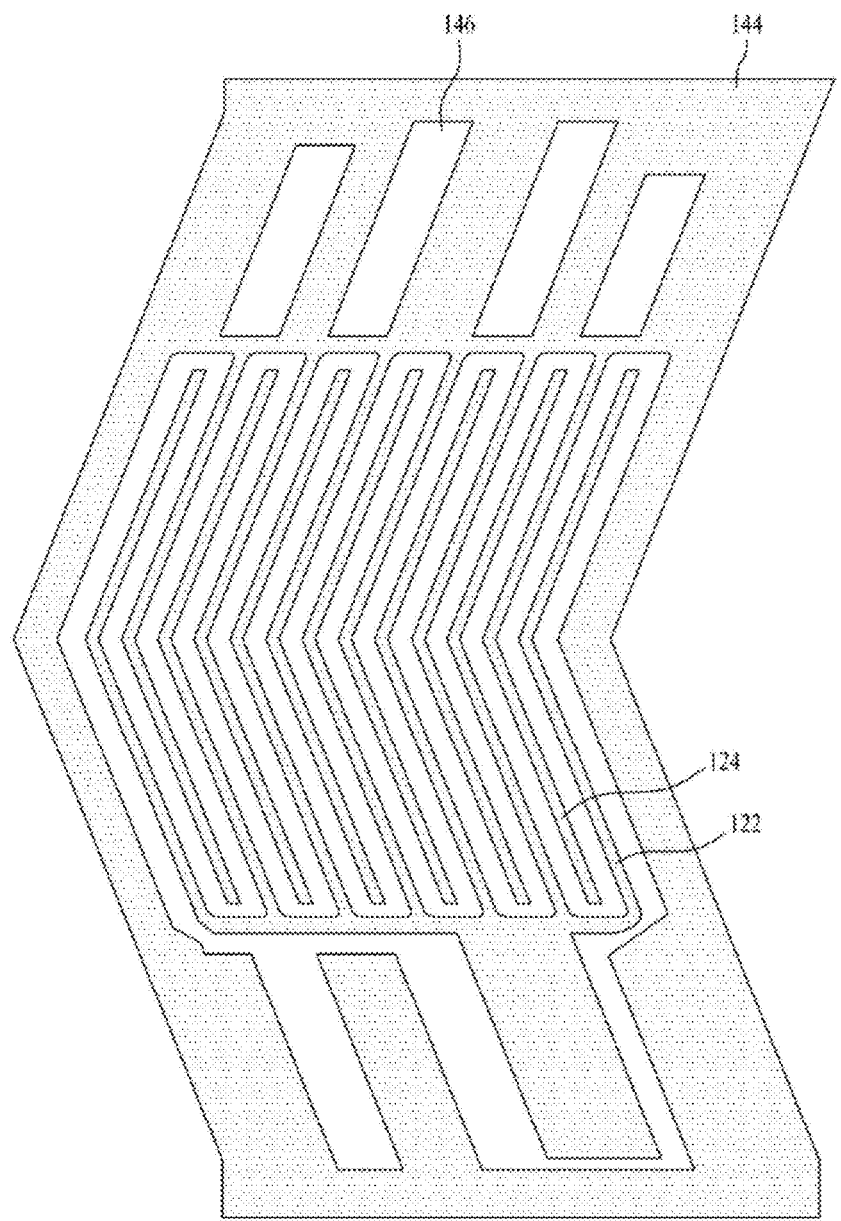
FIG. 4 is a plan view showing a pixel electrode, common electrode, and second black stripe formed on the same layer in FIG. 2 in detail.

The second black stripe 144 is formed to overlap with the gate and data lines 102 and 104, so as to prevent color interference between the neighboring pixels. Also, the second black stripe 144 is formed over the first black stripe 142 so as to overlap with the first black stripe 142, which may alleviate a higher reflectance of the first black stripe 142 than that of the second black stripe 144. Also, the second black stripe 144 has a plurality of openings 146 spaced apart from one another, as shown in FIG. 4. The plurality of openings 146 is provided at a region where the second black stripe 144 overlapped with the first black stripe 142. In this case, the total area of the plurality of openings 146 is greater than about zero percent of the overlap area of the first and second black stripes 142 and 144 and less than 50%. Providing the openings 146 may reduce the area of the second black stripe 144, which may prevent tearing of the second black stripe 144.

FIGS. 5A to 5F are sectional views for explaining a method for manufacturing the lower array substrate shown in FIG. 3.

Figure 5A:
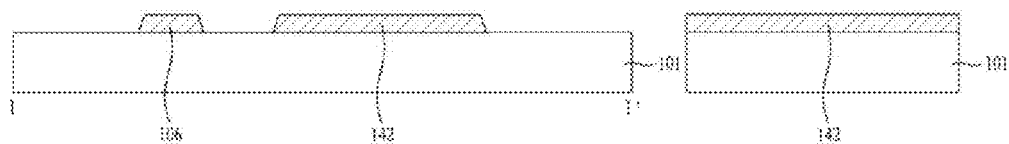
FIGS. 5A to 5F are sectional views for explaining a method for manufacturing the lower array substrate shown in FIG. 3.

Referring to FIG. 5A, a first conductive pattern including the gate line 102, gate electrode 106, and first black stripe 142 is formed on the lower substrate 101 via a first mask process. More specifically, a gate metal layer is formed on the lower substrate 101 via deposition, such as, for example, sputtering. The gate metal layer may be a single layer formed of a metal material, such as Mo, Ti, Cu, AlNd, Al, Cr or alloys thereof, or may have a multilayer structure using the above materials. Next, the gate metal layer is patterned via a photolithography process and etching process, whereby the first conductive pattern including the gate line 102, gate electrode 106, and first black stripe 142 is formed.

Figure 5B:
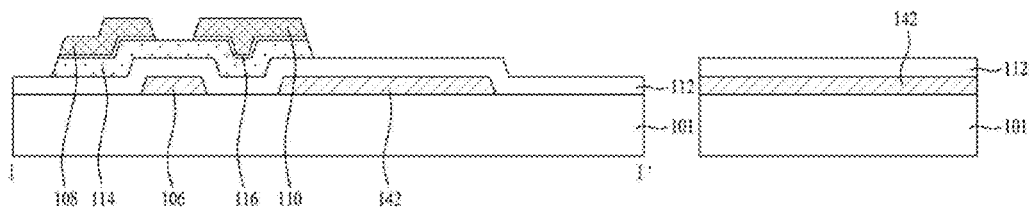

Referring to FIG. 5B, the gate insulating film 112 is formed on the lower substrate 101 on which the first conductive pattern has been formed. A semiconductor pattern including a stack of the active layer 114 and ohmic contact layer 116 and a second conductive pattern including the data line 104, source electrode 108, and drain electrode 110 are formed over the gate insulating film 112 via a second mask process.

More specifically, in a state in which the first conductive pattern has been formed on the lower substrate 101, the gate insulating film 112, amorphous silicon layer, and n+ doped (or p+ doped) amorphous silicon layer are sequentially formed on the lower substrate 101 via deposition, such as, for example, Plasma Enhanced Chemical Vapor Deposition (PECVD), and in turn a second metal layer is formed thereabove via deposition, such as, for example, sputtering. The gate insulating film 112 is formed of an inorganic insulating material, such as SiOx, SiNx, etc. The second metal layer may be a single layer formed of a metal material, such as Mo, Ti, Cu, AlNd, Al, Cr or alloys thereof, or may have a multilayer structure using the above materials. Next, the amorphous silicon layer, n+ doped (or p+ doped) amorphous silicon layer, and the second metal layer are patterned using a photoresist pattern mask that is obtained via a photolithography process using a halftone mask or slit mask, whereby the active layer 114, ohmic contact layer 116, data line 104, source electrode 108, and drain electrode 110 are formed on the gate insulating film 112.

Figure 5C:
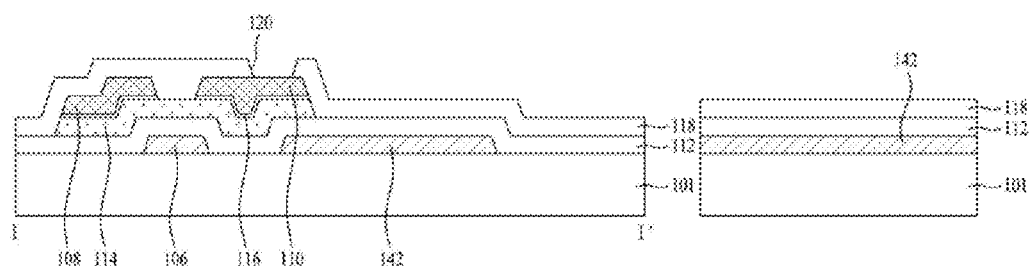

Referring to FIG. 5C, the protective film 118 having the pixel contact hole 120 is formed on the gate insulating film 112, on which the second conductive pattern has been formed, via a third mask process.

More specifically, in a state in which the second conductive pattern has been formed on the gate insulating film 112, the protective film 118 is formed on the gate insulating film 112 via PECVD, spin coating, spinless coating, or the like. The protective film 118 may be formed of an inorganic insulating material similar to the gate insulating film 112, or may be formed of an organic insulating material. As the protective film 118 is patterned via a photolithography process and etching process using a third photo-mask on the protective film 118, the pixel contact hole 120 is formed. Here, the pixel contact hole 120 penetrates the protective film 118 to expose the drain electrode 110.

Figure 5D:
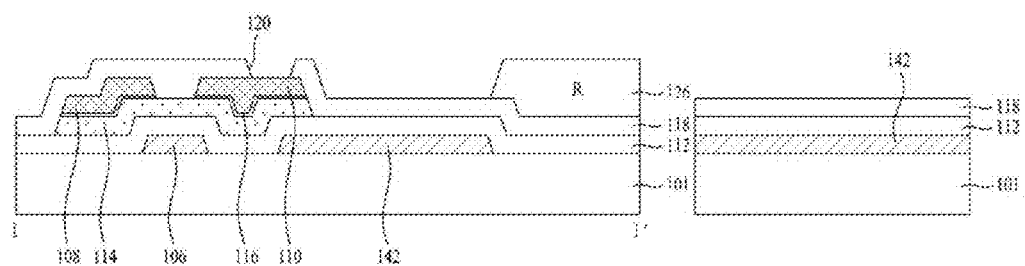

Referring to FIG. 5D, the red, green, and blue color filters 126 are formed over the lower substrate 101, on which the protective film 118 has been formed, via a fourth mask process.

More specifically, in a state in which the protective film 118 has been formed on the lower substrate 101, a red color layer is applied onto the lower substrate 101 and is patterned via a photolithography process to form a red color filter. Next, a green color filter is formed by applying a green color layer and patterning the green color layer via a photolithography process. Thereafter, a blue color filter is formed by applying a blue color layer and patterning the blue color layer via a photolithography process.

Figure 5E:
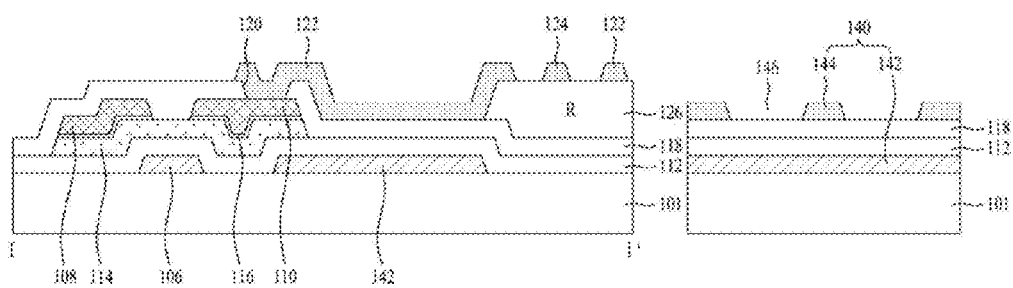

Referring to FIG. 5E, a third conductive pattern including the pixel electrode 122, common electrode 124, and second black stripe 144 is formed over the substrate 101 on which the red, green, and blue color filters 126 have been formed. More specifically, a third metal layer is formed on the lower substrate 101 via deposition, such as, for example, sputtering. The third metal layer may be a single layer formed of a metal material, such as MoTi, Cu, CuNx, Al, Cr or alloys thereof, or may have a multilayer structure using the above materials. For example, the third metal layer is formed by stacking a reflective MoTi layer and a transparent and substantially non-reflective ITO or CuNx layer one above another. Next, the third metal layer is patterned via a photolithography process and etching process, whereby the third conductive pattern including the pixel electrode 122, common electrode 124, and second black stripe 144 is formed.

Figure 5F:
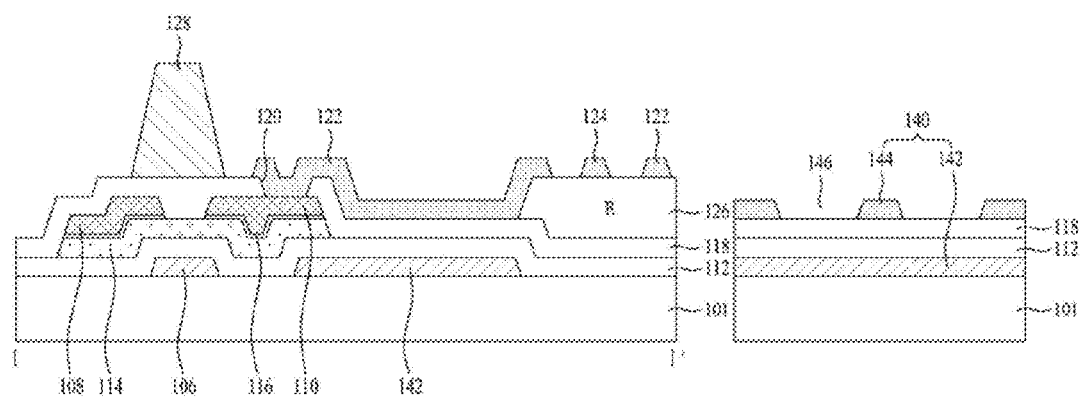

Referring to FIG. 5F, the column spacer 128 is formed on the lower substrate 101 on which the third conductive pattern has been formed. More specifically, the column spacer 128 is formed on the lower substrate 101, on which the third conductive pattern has been formed, by applying an organic insulating material, such as photo-acryl, on the lower substrate 101, and patterning the organic insulating material via a photolithography process and etching process.

Figure 6:
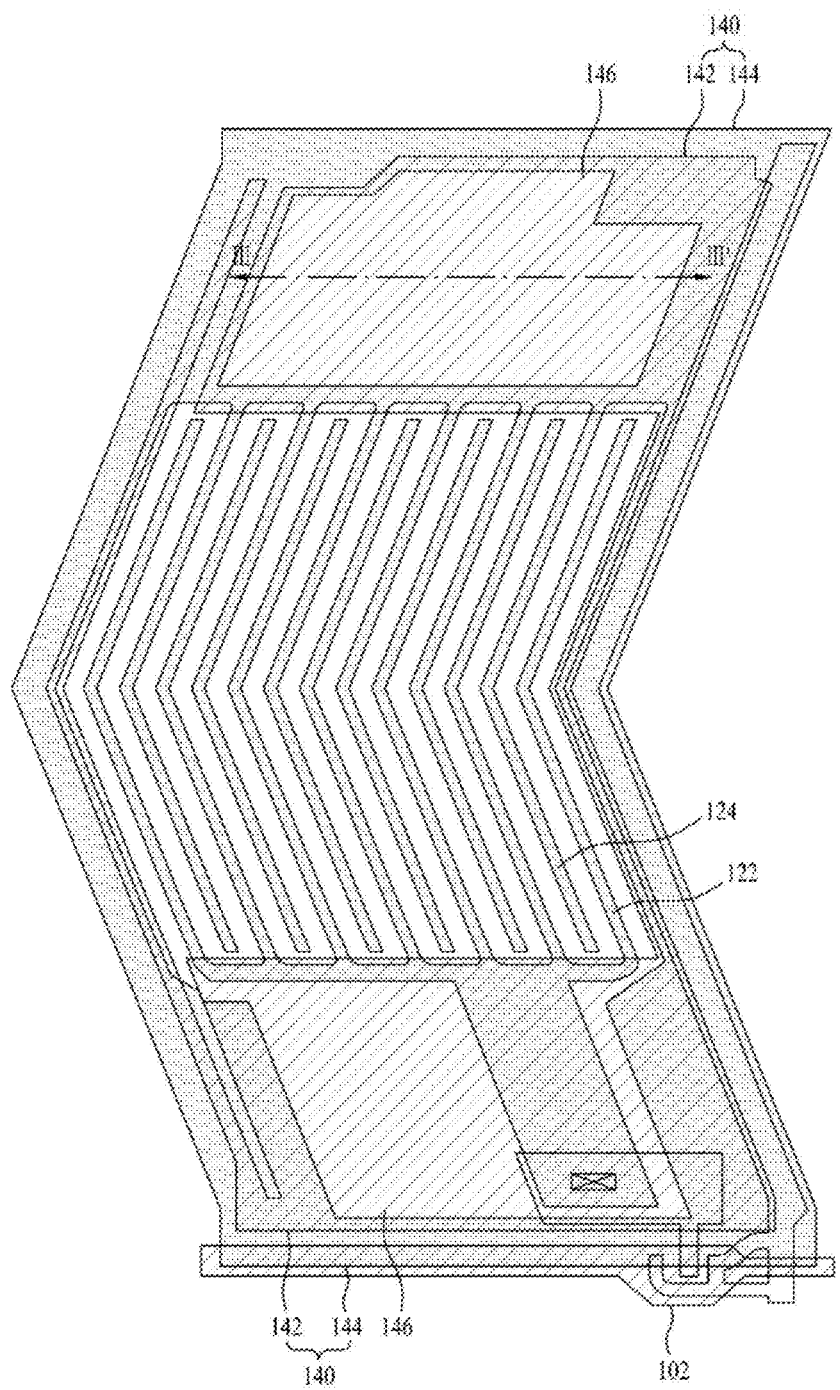
FIG. 6 is a plan view showing a lower array substrate of a stereoscopic image display device according to a second embodiment of the present invention.
Figure 7:
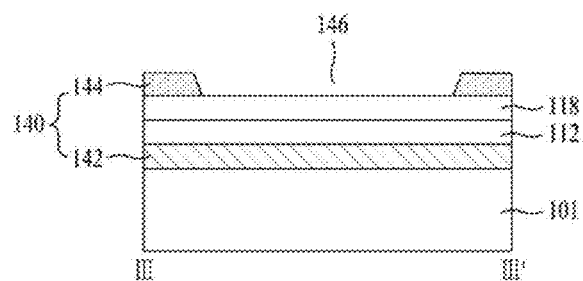
FIG. 7 is a sectional view showing the lower array substrate taken along line "III-III" in FIG. 6.

FIG. 6 is a plan view showing a lower array substrate according to a second embodiment of the present invention, and FIG. 7 is a sectional view showing the lower array substrate taken along line "III-III" in FIG. 6.

As compared to the lower array substrate shown in FIGS. 2 and 3, the lower array substrate shown in FIGS. 6 and 7 has the same constituent elements except for the second black stripe 144 that has an opening 146 having a relatively large area. Thus, a detailed description of the same constituent elements will be omitted hereinafter.

The black stripe 140 shown in FIGS. 6 and 7 includes the first black stripe 142, which is formed on the same layer as and formed of the same material as the gate electrode 106, and the second black stripe 144, which is formed on the same layer as and formed of the same material as the pixel electrode 122.

The first black stripe 142 takes the form of a plate provided at a remaining region of each pixel area except for a region where the color filter 126 is formed, i.e. provided at either upper or lower side of each pixel area, and serves to prevent crosstalk of right-eye and left-eye images.

Figure 8:
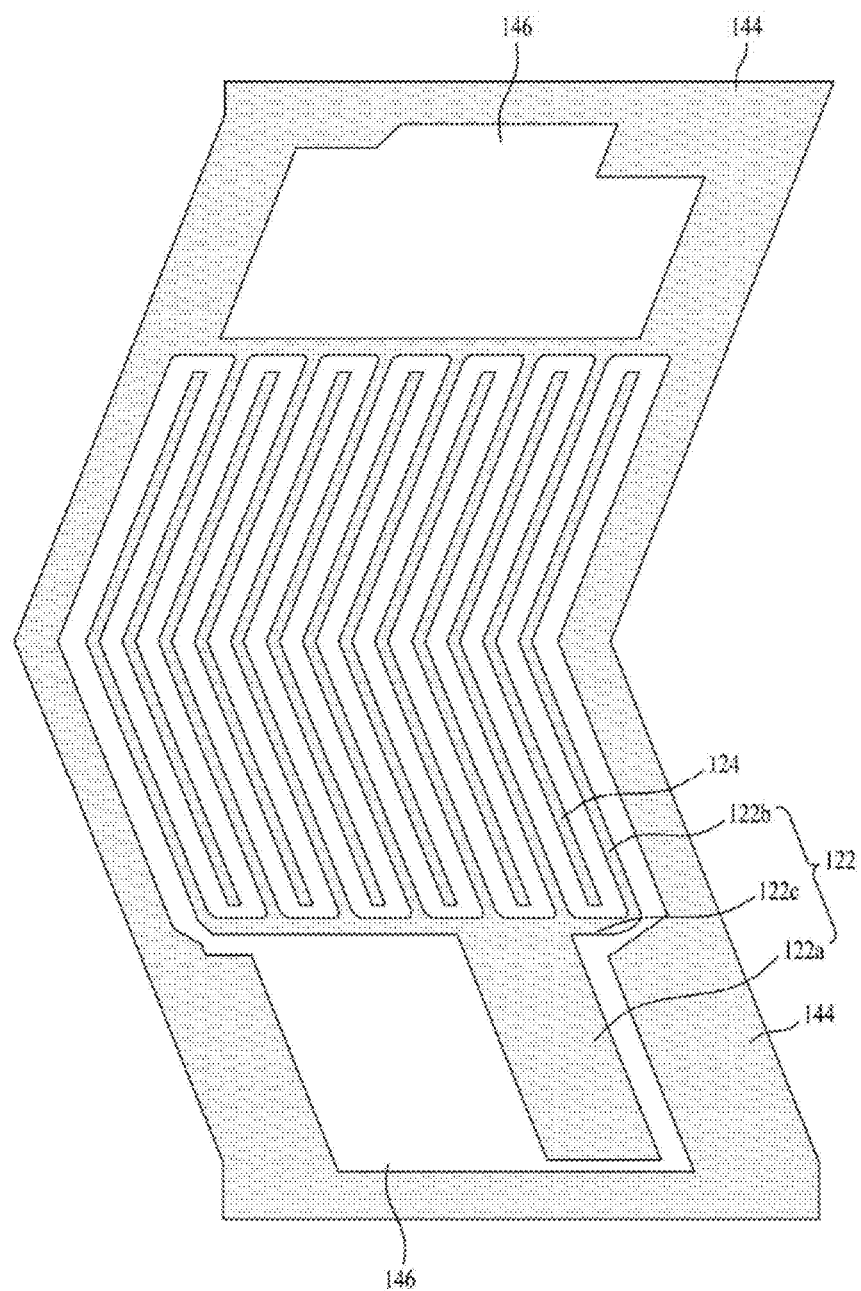
FIG. 8 is a plan view showing a pixel electrode, common electrode, and second black stripe formed on the same layer in FIG. 6 in detail.

The second black stripe 144 is formed to overlap with the gate and data lines 102 and 104, so as to prevent color interference between the neighboring pixels. Also, the second black stripe 144 has the single opening 146, as shown in FIG. 8. The single opening 146 is provided at a region where the second black stripe 144 overlapped with the first black stripe 142. In this case, the area of the opening 146 is greater than about 50% of the overlap area of the first and second black stripes 142 and 144 and less than 100%. Providing the opening 146 may reduce the area of the second black stripe 144, which may prevent tearing of the second black stripe 144.

Figure 9:
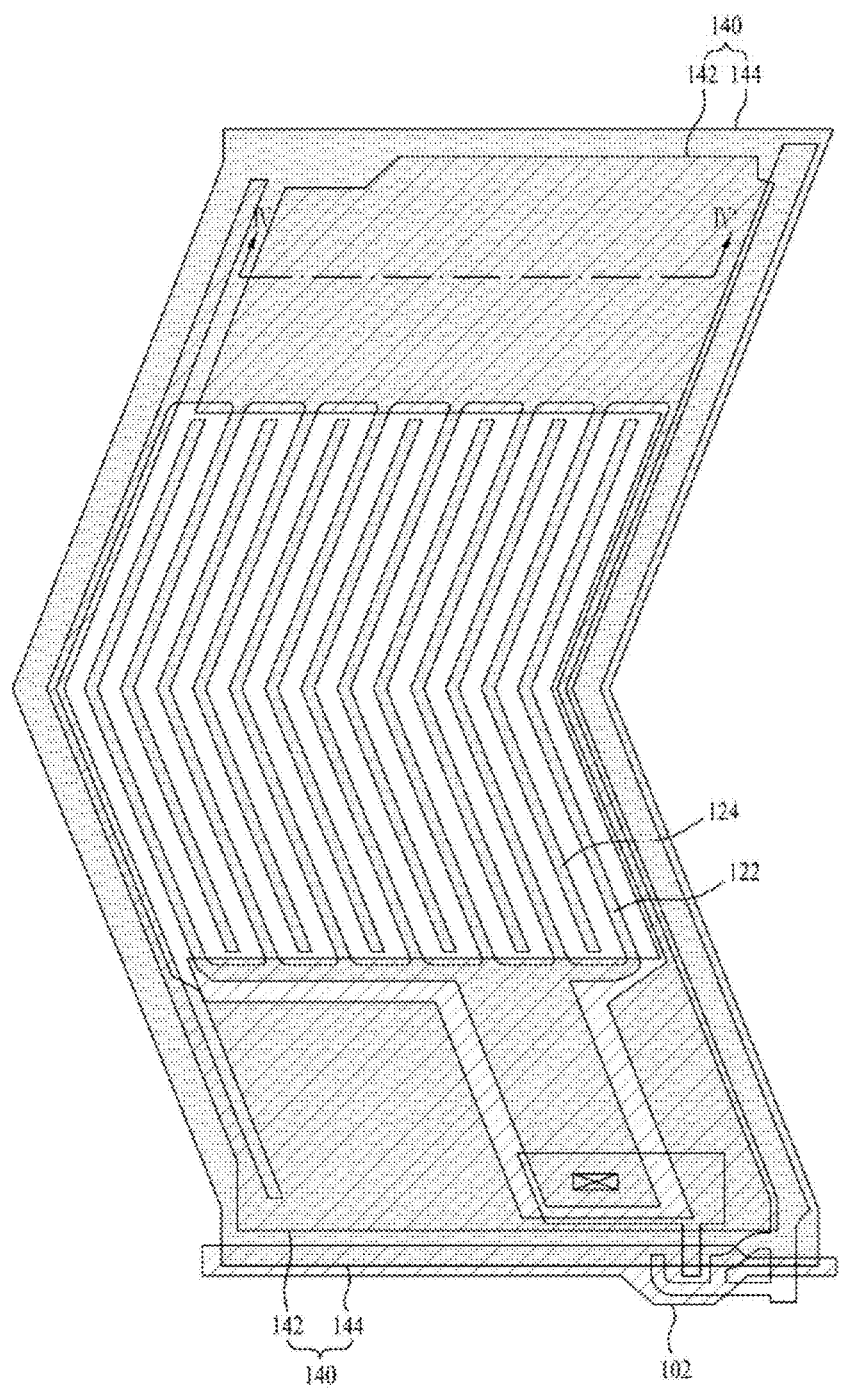
FIG. 9 is a plan view showing a lower array substrate of a stereoscopic image display device according to a third embodiment of the present invention.
Figure 10:
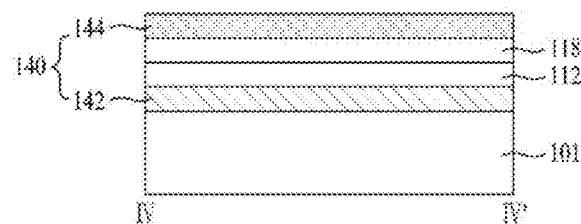
FIG. 10 is a sectional view showing the lower array substrate taken along line "IV-IV" in FIG. 9.

FIG. 9 is a plan view showing a lower array substrate according to a third embodiment of the present invention, and FIG. 10 is a sectional view showing the lower array substrate taken along line "IV-IV" in FIG. 9.

As compared to the lower array substrate shown in FIGS. 2 and 3, the lower array substrate shown in FIGS. 9 and 10 has the same constituent elements except for the second black stripe 144 in the form of a plate. Thus, a detailed description of the same constituent elements will be omitted hereinafter.

The black stripe 140 shown in FIGS. 9 and 10 includes the first black stripe 142, which is formed on the same layer as and formed of the same material as the gate electrode 106, and the second black stripe 144, which is formed on the same layer as and formed of the same material as the pixel electrode 122.

The first black stripe 142 takes the form of a plate provided at a remaining region of each pixel area except for a region where the color filter 126 is formed, i.e. provided at either upper or lower side of each pixel area, and serves to prevent crosstalk of right-eye and left-eye images.

Figure 11:
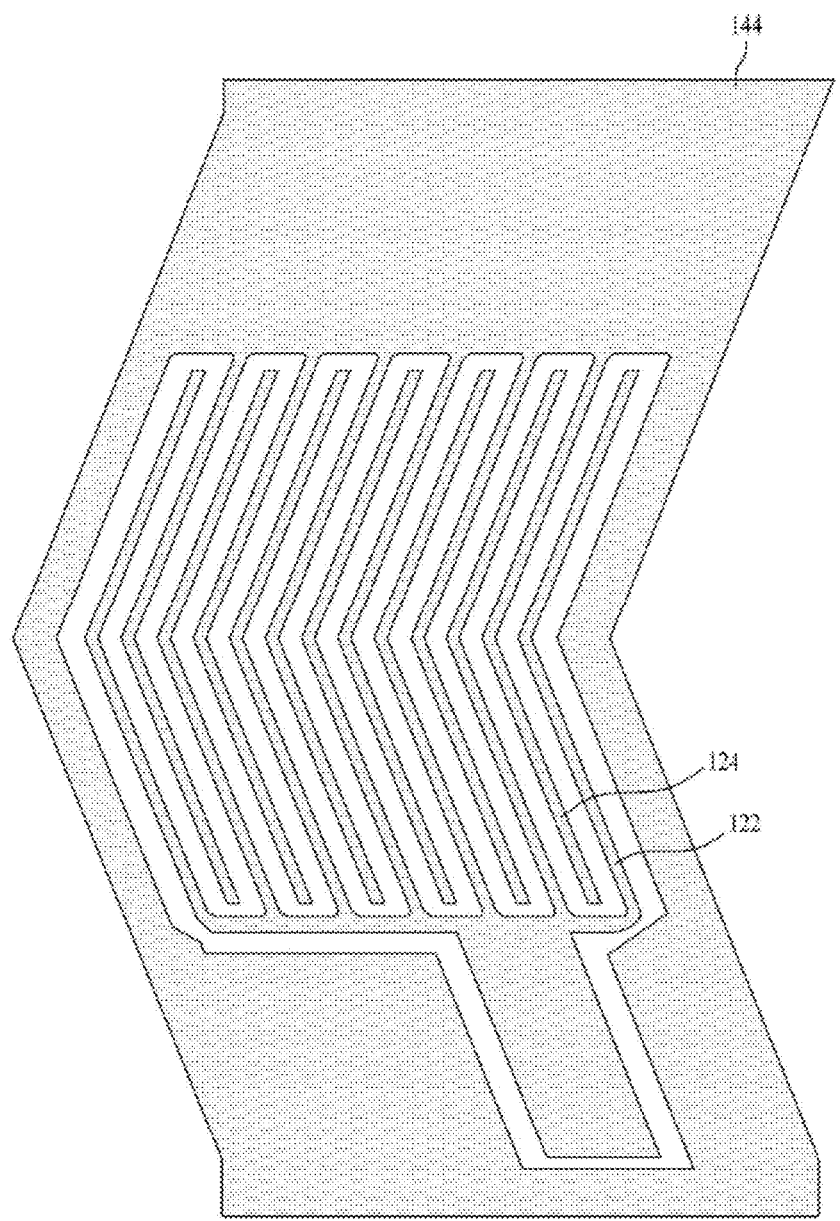
FIG. 11 is a plan view showing a pixel electrode, common electrode, and second black stripe formed on the same layer in FIG. 9 in detail.

The second black stripe 144 is formed to overlap with the gate and data lines 102 and 104, so as to prevent color interference between the neighboring pixels. Also, the second black stripe 144, as shown in FIG. 11, takes the form of a plate overlapped with the first black stripe 142. This may alleviate a higher reflectance of the first black stripe 142 than that of the second black stripe 144.

Figure 12:
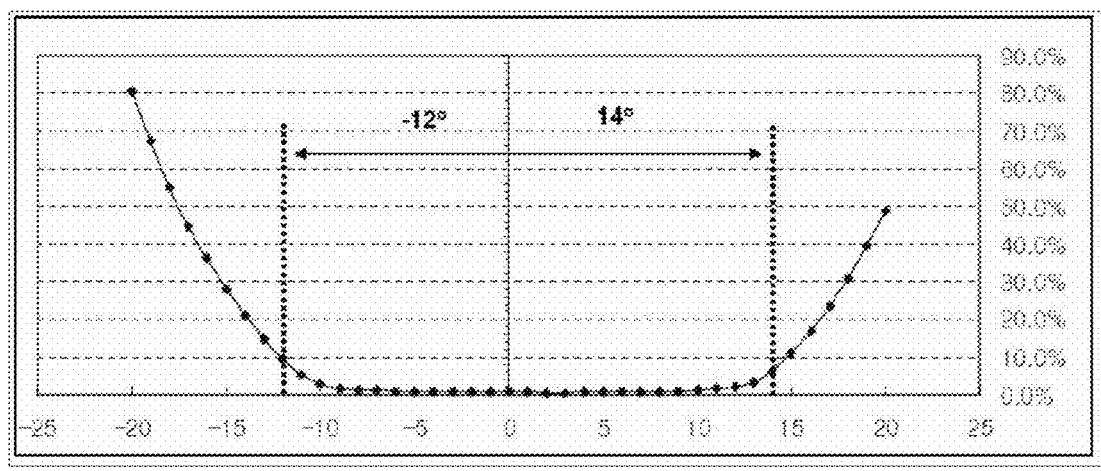
FIG. 12 is a graph showing a crosstalk value of a 3D image depending on a 3D viewing angle of the stereoscopic image display device according to the present invention.

FIG. 12 is a graph showing a crosstalk value of a 3D image depending on a viewing angle of the stereoscopic image display device according to the present invention. In FIG. 12, the abscissa represents an up(+)/down(−) viewing angle (deg.) of a 3D image, and the ordinate represents a 3D crosstalk value (%). 3D crosstalk (CT) is represented by the following Equation 1.

$$CT = \frac{L_{Black}R_{White} - \text{Black}}{L_{White}R_{Black} - \text{Black}} \times 100 \qquad \text{Equation 1}$$

Here, '$L_{Black}R_{White}$' is a brightness value in a pattern in which a left-eye pixel is black and a right-eye pixel is white, '$L_{white}R_{Black}$' is a brightness value in a pattern in which a left-eye pixel is white and a right-eye pixel is black, and 'Black' is a brightness value measured when all pixels are black.

Typically, a viewing angle under the condition in which a 3D crosstalk (CT) value calculated via the above Equation 1 is a critical value or less is defined as a 3D viewing angle that can obtain a high quality 3D image. As a result, according to the present invention, it can be understood that a user can view a high quality 3D image within a viewing angle range of about 26 degrees.

Meanwhile, although the present invention exemplifies the case in which the first black stripe 142 is formed of the same material as the gate electrode 106 and the second black stripe 144 is formed of the same material as the pixel electrode 122, alternatively, at least any one of the first and second black stripes 142 and 144 may be formed on the same layer as and formed of the same material as the drain electrode 110, and the black stripe 140 may be formed into two or more layers.

Also, although the present invention exemplifies an In Plane Switching (IPS) liquid crystal display panel, the present invention may be applied even to Twisted Nematic (TN), Fringe Field Switching (FFS), and Vertical Alignment (VA) liquid crystal display panels, and may be applied even to organic electroluminescent display panels as well as liquid crystal display panels.

As is apparent from the above description, in a stereoscopic image display device according to the present invention, a multilayered black stripe is formed using at least two metal layers of a thin film transistor and a pixel electrode. In this case, the black stripe of the present invention is displayed as black between pixels of an odd number (or even number) horizontal line that displays a right-eye image and pixels of an even number (or odd number) horizontal line that displays a left-eye image, which may prevent 3D crosstalk of right-eye and left-eye images. In this way, the present invention achieves a widened up/down viewing angle upon realization of a 3D image, resulting in enhanced visibility of a 3D image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display device comprising:
   a display panel configured to selectively form a 2-Dimensional (2D) image and a 3-Dimensional (3D) image, the display panel including a lower array substrate in which a color filter and a thin film transistor are on the same substrate, and an upper array substrate arranged to face the lower array substrate; and
   a patterned retarder to separate an image displayed on the display panel into a left-eye image and a right-eye image upon formation of the 3D image,
   wherein the lower array substrate includes:
   a gate line and a data line connected to the thin film transistor and intersected each other to define pixel areas;
   a pixel electrode connected to the thin film transistor and located at each pixel area; and
   a black stripe at a boundary between a pixel area corresponding to the left-eye image and a pixel area corresponding to the right-eye image, and
   wherein the black stripe includes:
   a first black stripe on the same layer as and of the same material as an opaque layer included in the thin film transistor; and
   a second black stripe overlapping the first black stripe, the second black stripe being on the same layer as and of the same material as the pixel electrode,
   wherein the first black stripe has a plate shape at upper and lower sides of each pixel area except for a region having the color filter, and is on the same layer as and of the same material as a gate electrode of the thin film transistor, and
   wherein the second black stripe has a plate shape at a region where the second black stripe is overlapped with the first black stripe.

2. The device according to claim 1, further comprising a common electrode to form a horizontal electric field with the pixel electrode,
   wherein the common electrode is on the same layer as and of the same material as the second black stripe, and is connected to the second black stripe.

3. The device according to claim 1, wherein the second black stripe has a plurality of openings spaced apart from one another, and the plurality of openings is at a region where the second black stripe is overlapped with the first black stripe.

4. The device according to claim 1, wherein the second black stripe has a single opening at a region where the second black stripe overlapped with the first black stripe.

5. The device according to claim 1,
   wherein the patterned retarder includes a first retarder configured to transmit a first polarized light component and a second retarder configured to transmit a second polarized light component, the first and second retarders being alternately arranged, and
   wherein the black stripe overlaps with a boundary between the first retarder and the second retarder.

6. A method for manufacturing a stereoscopic image display device, comprising:
   preparing a lower array substrate, wherein the lower array substrate includes a color filter and a thin film transistor at each pixel area on the same substrate, and first and second black stripes at a boundary between neighboring pixel areas;
   forming a display panel configured to selectively form a 2D image and a 3D image by bonding the lower array substrate and an upper array substrate to face each other; and
   forming a patterned retarder on the display panel, wherein the patterned retarder serves to separate an image displayed on the display panel into a left-eye image and a right-eye image upon formation of the 3D image,
   wherein the preparing the lower array substrate includes:
   forming the thin film transistor, and simultaneously forming the first black stripe on the same layer as any one opaque metal layer included in the thin film transistor using the same material as the opaque metal layer; and
   forming a pixel electrode, connected to the thin film transistor, at each pixel area, and simultaneously forming the second black stripe on the same layer as the pixel electrode using the same material as the pixel electrode, and wherein the second black stripe is arranged on the same substrate as the first black stripe to overlap with the first black stripe at the boundary between the neighboring pixel areas, wherein the first black stripe has a plate shape at upper and lower sides of each pixel area except for a region having the color filter, and the first black stripe is on the same layer as and of the same material as a gate electrode of the thin film transistor, and wherein the second black stripe has a plate shape at a region where the second black stripe is overlapped with the first black stripe.

7. The method according to claim 6, further comprising forming a common electrode on the same layer as the second black stripe using the same material as the second black stripe so as to be connected to the second black stripe, wherein the common electrode forms a horizontal electric field with the pixel electrode.

8. The method according to claim 6, wherein the second black stripe has a plurality of openings spaced apart from one another, and the plurality of openings is at a region where the second black stripe is overlapped with the first black stripe.

9. The method according to claim 6, wherein the second black stripe has a single opening at a region where the second black stripe is overlapped with the first black stripe.

10. The device according to claim 1, wherein the second black stripe and the pixel electrode are directly on a protective film.

11. The method according to claim 6, wherein the second black stripe and the pixel electrode are directly on a protective film.

12. A stereoscopic image display device comprising:

a display panel configured to selectively form a 2-Dimensional (2D) image and a 3-Dimensional (3D) image, the display panel including a lower array substrate in which a color filter and a thin film transistor are on the same substrate, and an upper array substrate arranged to face the lower array substrate; and a patterned retarder to separate an image displayed on the display panel into a left-eye image and a right-eye image upon formation of the 3D image, wherein the lower array substrate includes:

a gate line and a data line connected to the thin film transistor and intersected each other to define pixel areas;

a pixel electrode connected to the thin film transistor and located at each pixel area; and a black stripe at a boundary between a pixel area corresponding to the left-eye image and a neighboring pixel area corresponding to the right-eye image, and wherein the black stripe includes:

a first black stripe on the same layer as and of the same material as an opaque layer included in the thin film transistor; and a second black stripe on the same layer as and of the same material as the pixel electrode, and wherein the second black stripe is arranged on the same substrate as the first black stripe to overlap with the first black stripe at the boundary, wherein the first black stripe has a plate shape at upper and lower sides of each pixel area except for a region having the color filter, and the first black stripe is on the same layer as and of the same material as a gate electrode of the thin film transistor, and wherein the second black stripe has a plate shape at a region where the second black stripe is overlapped with the first black stripe.

13. The device according to claim 12, wherein the second black stripe has a plurality of openings spaced apart from one another, and the plurality of openings is at a region where the second black stripe is overlapped with the first black stripe such that a total area of the plurality of openings is greater than 0% and less than 50%.

14. The device according to claim 12, wherein the second black stripe has a single opening at a region where the second black stripe overlapped with the first black stripe such that a total area of the single opening is greater than about 50% and less than 100%.

15. The device according to claim 3, wherein a total area of the plurality of openings is greater than 0% and less than 50%.

16. The device according to claim 4, wherein a total area of the single opening is greater than about 50% and less than 100%.

17. The method according to claim 8, wherein a total area of the plurality of openings is greater than 0% and less than 50%.

18. The method according to claim 9, wherein a total area of the single opening is greater than about 50% and less than 100%.

* * * * *